United States Patent
Hirata et al.

(10) Patent No.: US 12,417,883 B2
(45) Date of Patent: *Sep. 16, 2025

(54) ELECTROLYTIC CAPACITOR AND METHOD FOR MANUFACTURING SAME

(71) Applicant: Panasonic Intellectual Property Management Co., Ltd., Osaka (JP)

(72) Inventors: Yoshikazu Hirata, Saga (JP); Yoshiaki Ishimaru, Saga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 459 days.

This patent is subject to a terminal disclaimer.

(21) Appl. No.: 17/813,391

(22) Filed: Jul. 19, 2022

(65) Prior Publication Data

US 2022/0351912 A1    Nov. 3, 2022

Related U.S. Application Data

(63) Continuation of application No. PCT/JP2021/003298, filed on Jan. 29, 2021.

(30) Foreign Application Priority Data

Jan. 30, 2020    (JP) .................................. 2020-013196

(51) Int. Cl.
*H01G 9/00*    (2006.01)
*H01G 9/025*    (2006.01)
*H01G 9/035*    (2006.01)

(52) U.S. Cl.
CPC ........... *H01G 9/0036* (2013.01); *H01G 9/025* (2013.01); *H01G 9/035* (2013.01)

(58) Field of Classification Search
None
See application file for complete search history.

(56) References Cited

U.S. PATENT DOCUMENTS 6,215,651 B1    4/2001    Takada et al.
9,852,825 B2 *  12/2017   Yamazaki .......... C08G 73/0266
(Continued)

FOREIGN PATENT DOCUMENTS

CN    103160121 B  *  3/2015    ............. B32B 27/08
CN    104919555 A     9/2015
(Continued)

OTHER PUBLICATIONS

Translation (Year: 2024).*
(Continued)

*Primary Examiner* — Dion R. Ferguson
(74) *Attorney, Agent, or Firm* — Rimon P.C.

(57) ABSTRACT

An electrolytic capacitor includes a capacitor element. The capacitor element includes a separator, an anode body and a cathode body each having a foil shape and facing each other with the separator disposed between the anode body and the cathode body, and an electrolyte layer being in contact with the anode body, the cathode body, and the separator. The electrolyte layer contains a first conductive polymer and a first compound having a melting point of 50° C. or higher. The first compound is at least one compound selected from the group consisting of a sugar and a polyhydric alcohol. The first compound is unevenly distributed in the electrolyte layer.

16 Claims, 3 Drawing Sheets

(56) References Cited

U.S. PATENT DOCUMENTS

| | | | |
|---|---|---|---|
| 10,079,112 B2 * | 9/2018 | Tsubaki | H01G 9/15 |
| 10,354,806 B2 * | 7/2019 | Tsubaki | H01G 9/028 |
| 12,119,185 B2 * | 10/2024 | Ishimaru | H01G 9/028 |
| 2008/0002334 A1 | 1/2008 | Kakuma et al. | |
| 2008/0232035 A1 | 9/2008 | Biler | |
| 2011/0080690 A1 * | 4/2011 | Ning | H01G 9/028 29/25.03 |
| 2013/0258554 A1 * | 10/2013 | Ode | H01G 9/0036 29/25.03 |
| 2013/0279079 A1 * | 10/2013 | Merker | H01G 9/0036 29/25.41 |
| 2014/0022705 A1 | 1/2014 | Tomioka et al. | |
| 2015/0140203 A1 | 5/2015 | Intelmann et al. | |
| 2015/0279502 A1 * | 10/2015 | Yamazaki | C08G 73/0266 252/500 |
| 2015/0287540 A1 * | 10/2015 | Koseki | H01G 9/035 427/80 |
| 2017/0148575 A1 | 5/2017 | Tsubaki et al. | |
| 2017/0263347 A1 * | 9/2017 | Yamazaki | C09D 179/02 |
| 2017/0278639 A1 * | 9/2017 | Tsubaki | H01G 9/028 |
| 2021/0198469 A1 * | 7/2021 | Bunha | C08F 212/30 |
| 2022/0351912 A1 * | 11/2022 | Hirata | H01G 9/028 |
| 2022/0351913 A1 * | 11/2022 | Saito | H01G 9/035 |
| 2022/0375693 A1 * | 11/2022 | Ishimaru | H01G 9/035 |

FOREIGN PATENT DOCUMENTS

| | | | |
|---|---|---|---|
| CN | 106575578 A | 4/2017 | |
| JP | 11-219860 | 8/1999 | |
| JP | 2008-010657 | 1/2008 | |
| JP | 2008-235908 | 10/2008 | |
| JP | 2012-517113 | 7/2012 | |
| JP | 2013-138145 | 7/2013 | |
| JP | 2014-007422 | 1/2014 | |
| JP | 2014-090107 | 5/2014 | |
| JP | 7486211 B2 * | 5/2024 | H01G 9/035 |
| WO | WO-2012041506 A2 * | 4/2012 | H01G 11/48 |
| WO | WO-2012041507 A1 * | 4/2012 | C08K 5/132 |
| WO | 2012/137969 | 10/2012 | |
| WO | 2014/098006 | 6/2014 | |
| WO | WO-2016088300 A1 * | 6/2016 | H01G 9/0036 |
| WO | WO-2020022471 A1 * | 1/2020 | H01G 9/035 |
| WO | WO-2020040851 A1 * | 2/2020 | H01G 11/48 |
| WO | WO-2021252170 A1 * | 12/2021 | H01G 9/025 |

OTHER PUBLICATIONS

Translation (Year: 2015).*
English Translation of Chinese Office Action dated Jun. 14, 2024 for the related Chinese Patent Application No. 202180011088.5.
International Search Report of PCT application No. PCT/JP2021/003298 dated Apr. 20, 2021.

* cited by examiner

ELECTROLYTIC CAPACITOR AND METHOD FOR MANUFACTURING SAME

BACKGROUND

1. Technical Field

The present disclosure relates to an electrolytic capacitor and a method for manufacturing an electrolytic capacitor.

2. Description of the Related Art

Capacitors used in electronic devices are required to have a large capacitance and a small equivalent series resistance (ESR) value in a high frequency region. Promising candidates as large capacitance, and low ESR capacitors are electrolytic capacitors including a conductive polymer such as polypyrrole, polythiophene, polyfuran, or polyaniline. Unexamined Japanese Patent Publication No. 2008-10657 discloses a method of impregnating, with a dispersion containing a conductive polymer and a solvent, a capacitor element formed by winding an anode foil and a cathode foil with a separator interposed therebetween,

SUMMARY

An aspect of the present disclosure relates to a method for manufacturing an electrolytic capacitor. The manufacturing method includes: a step (i) of forming a capacitor element precursor that includes a separator, an anode body, and a cathode body, the anode body and the cathode body each having a foil shape and facing each other with the separator disposed between the anode body and the cathode body; a step (ii) of disposing a first compound having a melting point of 50° C. or higher inside the capacitor element precursor, the first compound being at least one compound selected from the group consisting of a sugar and a polyhydric alcohol; and a step (iii) of forming a first layer containing a first conductive polymer inside the capacitor element precursor after the step (ii). The step (iii) includes a step (iii-a) of impregnating the capacitor element precursor with a first aqueous dispersion liquid containing the first conductive polymer after the step (ii), and a step (iii-b) of drying the first aqueous dispersion liquid to form the first layer.

Another aspect of the present disclosure relates to an electrolytic capacitor. The electrolytic capacitor is an electrolytic capacitor including a capacitor element. The capacitor element includes a separator, an anode body and a cathode body each having a foil shape and facing each other with the separator disposed between the anode body and the cathode body, and an electrolyte layer being in contact with the anode body, the cathode body, and the separator. The electrolyte layer contains a first conductive polymer and a first compound having a melting point of 50° C. or higher. The first compound is at least one compound selected from the group consisting of a sugar and a polyhydric alcohol. The first compound is unevenly distributed in the electrolyte layer.

According to the present disclosure, an electrolytic capacitor with superior characteristics is obtained.

DETAILED DESCRIPTIONS OF EMBODIMENTS

In order to achieve more preferable characteristics (particularly, low ESR), it is necessary to increase the amount of the conductive polymer disposed between the anode foil and the cathode foil.

In such a circumstance, the present disclosure provides an electrolytic capacitor having superior characteristics and a method for manufacturing the electrolytic capacitor.

Hereinafter, an exemplary embodiment of the present disclosure will be described with reference to examples, but the present disclosure is not limited to the examples described below. In the following description, specific numerical values and materials may be provided as examples, but other numerical values and materials may be applied as long as the effect of the present disclosure can be obtained. In the following description, a melting point is a value at 1 atm unless otherwise specified. A viscosity is a value at room temperature (25° C.) and 1 atm unless otherwise specified.

As a result of studies, the inventors of the present application have found that an electrolytic capacitor having superior characteristics is obtainable by disposing a conductive polymer in a capacitor element precursor by a specific method. The present disclosure has been based on this new finding.

(Electrolytic Capacitor)

An electrolytic capacitor of the present disclosure is an electrolytic capacitor including a capacitor element. The capacitor element includes a separator, an anode body and a cathode body each having a foil shape and facing each other with the separator disposed between the anode body and the cathode body, and an electrolyte layer being in contact with the anode body, the cathode body, and the separator. The electrolyte layer contains a first compound and a first conductive polymer. The first compound is at least one compound selected from the group consisting of a sugar and a polyhydric alcohol and has a melting point of 50° C. or higher. The first compound is unevenly distributed in the electrolyte layer. The electrolytic capacitor of the present disclosure may be a first electrolytic capacitor described below or a second electrolytic capacitor described below. An electrolyte layer of the first electrolytic capacitor is different from an electrolyte layer of and the second electrolytic capacitor. However, examples of the exemplary embodiment include exemplary embodiments that belong to both the first electrolytic capacitor and the second electrolytic capacitor.

The electrolyte layer of the first electrolytic capacitor has an unevenly distributed portion in which the first compound is unevenly distributed more in at least a part of at least one portion selected from the group consisting of a portion in contact with the anode body, a portion in contact with the cathode body, and a portion in contact with the separator than in a portion other than the at least a part of the at least one portion.

The unevenly distributed portion in where the first compound is unevenly distributed may be in at least a part of a portion in contact with the anode body, at least a part of a portion in contact with the cathode body, at least a part of a portion in contact with the separator, or at least a part of two or more portions (for example, all portions) of these portions.

The electrolyte layer of the second electrolytic capacitor includes a first layer containing the first conductive polymer and a second layer containing a second conductive polymer. The second layer is formed on at least a part of surfaces of the anode body and the cathode body. The first layer is formed on at least the second layer. The electrolyte layer of the second electrolytic capacitor has the unevenly distributed portion in which the first compound is unevenly distributed more in at least a part of a portion in contact with an interface between the first layer and the second layer than in a portion other than the at least a part of the portion.

The first compound present in the unevenly distributed portion improves the fixability of the first conductive polymer by a hydroxyl group of the first compound. As a result, preferable characteristics (particularly, low ESR) can be achieved. Further, since the stability of the electrolyte layer is enhanced by improving the fixability of the first conductive polymer, the reliability of the electrolytic capacitor can be improved. By unevenly distributing the first compound much, a conductive polymer layer can be formed thick at the portion in which the first compound is unevenly distributed much.

The electrolyte layer of the first electrolytic capacitor may be constituted by the first compound and the first conductive polymer or may be constituted by other substances in addition to the first compound and the first conductive polymer. The electrolyte layer of the second electrolytic capacitor may be constituted by the first compound, the first conductive polymer, and second conductive polymer or may be constituted by other substances in addition to the first compound, the first conductive polymer, and second conductive polymer. As described below, the electrolyte layer of the electrolytic capacitor of the present disclosure may be an electrolyte layer (hybrid type electrolyte layer) that contains a conductive polymer and a liquid component described below (a non-aqueous solvent or a non-aqueous electrolytic solution). As the first and second conductive polymers (and dopants added thereto) and the liquid component, those used for known electrolyte layers of electrolytic capacitors may be used.

The electrolyte layer of the electrolytic capacitor of the present disclosure is a layer that contains the above-described conductive polymer as a main constituent element (for example, a content proportion is 50 mass % or more). When the electrolyte layer contains a liquid component, the liquid component is not considered in the calculation of the content proportion of the conductive polymer in the electrolyte layer.

(First Compound)

The first compound contained in the electrolyte layer of the electrolytic capacitor of the present disclosure will be described below. The first compound is at least one compound selected from the group consisting of a sugar and a polyhydric alcohol and has a melting point of 50° C. or higher. The melting point of the first compound is preferably higher than the temperature at the time of using the capacitor. The melting point of the first compound may range from 80° C. to 300° C., inclusive (for example, from 120° C. to 300° C., inclusive).

Examples of the sugar include glucose. Examples of the polyhydric alcohol include mannitol, sorbitol, xylitol, pentaerythritol, and trimethylolpropane. Mannitol, sorbitol, xylitol, pentaerythritol, and the like may be referred to as sugar alcohols. The first compound may be a sugar alcohol.

The number of hydroxyl groups in the first compound may range from 2 to 12, inclusive (for example, from 2 to 4, inclusive). Usually, the first compound is a water-soluble compound.

From another viewpoint, as the first compound, an organic compound (for example, an organic compound that is not a polymer) containing a plurality of hydroxyl groups (—OH) bonded to a carbon atom and having a melting point in the above range may be used. The molecular weight of the organic compound and the number of hydroxyl groups in the organic compound may each fall in the above ranges exemplified for the first compound.

The first compound may be at least one selected from the group consisting of glucose, mannitol, sorbitol, xylitol, pentaerythritol, and trimethylolpropane. The melting point of glucose is about 146° C. to 150° C., the melting point of mannitol is about 165° C. to 169° C., the melting point of sorbitol is about 93° C. to 95° C., the melting point of xylitol is about 92° C. to 97° C., the melting point of pentaerythritol is about 257° C. to 260° C., and the melting point of trimethylolpropane is about 56° C. to 58° C. The melting points of these substances may vary depending on the structure (stereoisomer). Glucose, mannitol, and pentaerythritol are preferred in terms of a high melting point.

(First Conductive Polymer)

The first conductive polymer (conductive polymer) used in the electrolytic capacitor of the present disclosure will be described below. Examples of the first conductive polymer include polypyrrole, polythiophene, polyfuran, polyaniline, polyacetylene, and derivatives thereof. The derivatives include polymers having polypyrrole, polythiophene, polyfuran, polyaniline, and polyacetylene as a basic skeleton. For example, the derivative of polythiophene includes poly(3,4-ethylenedioxythiophene) and the like. These conductive polymers may be used singly or in combination of two or more kinds thereof. The first conductive polymer may be a copolymer of two or more types of monomers. The weight average molecular weight of the first conductive polymer is not particularly limited, and may range, for example, from 1000 to 100000, inclusive. A preferred example of the first conductive polymer is poly(3,4-ethylenedioxythiophene) (PEDOT).

A dopant may be added to the first conductive polymer. It is preferable to use a polymer dopant, in view of suppressing the dedoping of the dopant from the first conductive polymer. Examples of the polymer dopant include polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. These may be used singly or in combination of two or more kinds thereof. These may be added in the form of a salt. The polymer dopant may be present in the electrolyte in the form of an anion in which a cation (for example, a proton) is dissociated from at least a part of an acidic group. A preferred example of the dopant is polystyrenesulfonic acid (PSS).

The weight average molecular weight of the dopant is not particularly limited. From the viewpoint of facilitating the formation of a homogeneous electrolyte layer, the weight average molecular weight of the dopant may range from 1000 to 100000, inclusive.

The first conductive polymer may be poly(3,4-ethylenedioxythiophene) doped with polystyrenesulfonic acid.

As the second conductive polymer constituting the second layer of the second electrolytic capacitor, the polymer exemplified for the first conductive polymer may be used. The first conductive polymer and the second conductive polymer may be the same as or different from each other.

The second layer of the electrolyte layer in the second electrolytic capacitor may contain a second compound that is at least one compound selected from the group consisting of a sugar and a polyhydric alcohol and has a melting point of 50° C. or higher. As the second compound, the compound exemplified for the first compound may be used. The first compound and the second compound may be the same as or different from each other.

When the second layer contains the second compound, the second layer may have an unevenly distributed portion in which the second compound is unevenly distributed more in at least a part of at least one portion selected from the group consisting of a portion in contact with the anode body, a portion in contact with the cathode body, and a portion in contact with the separator than in a portion other than the at least a part of the portion.

The electrolyte layer of the electrolytic capacitor of the present disclosure may contain a non-aqueous solvent or a non-aqueous electrolytic solution. Hereinafter, the non-aqueous solvent and the non-aqueous electrolytic solution contained in the electrolyte layer may be collectively referred to "liquid component (L)". The liquid component (L) may be a substance that is a liquid at room temperature (25° C.), or may be a substance that is a liquid at a temperature at which the electrolytic capacitor is used. A preferred example of the liquid component (L) is a liquid in which the first compound is not substantially dissolved.

The non-aqueous solvent may be an organic solvent or may be an ionic liquid. Examples of the non-aqueous solvent include polyhydric alcohols such as ethylene glycol and propylene glycol, cyclic sulfones such as sulfolane (SL), lactones such as γ-butyrolactone (γBL), amides such as N-methylacetamide, N,N-dimethylformamide, and N-methyl-2 pyrrolidone, esters such as methyl acetate, carbonate compounds such as propylene carbonate, ethers such as 1,4-dioxane, ketones such as methyl ethyl ketone, and formaldehyde.

As the non-aqueous solvent, a polymer solvent may be used. Examples of the polymer solvent include polyalkylene glycol, a derivative of the polyalkylene glycol, and a compound obtained by substituting at least one hydroxyl group of a polyhydric alcohol with polyalkylene glycol (including a derivative). Specific examples of the polymer solvent include polyethylene glycol (PEG), polyethylene glycol glyceryl ether, polyethylene glycol diglyceryl ether, polyethylene glycol sorbitol ether, polypropylene glycol, polypropylene glycol glyceryl ether, polypropylene glycol diglyceryl ether, polypropylene glycol sorbitol ether, and polybutylene glycol. Further, examples of the polymer solvent include an ethylene glycol-propylene glycol copolymer, an ethylene glycol-butylene glycol copolymer, and a propylene glycol-butylene glycol copolymer. One of these non-aqueous solvents may be used singly, or two or more thereof may be used in mixture.

The liquid component (L) may contain an acid component and a base component. Examples of the acid component include maleic acid, phthalic acid, benzoic acid, pyromellitic acid, and resorcinic acid. Examples of the base component include 1,8-diazabicyclo[5,4,0]undecene-7,1,5-diazabicyclo[4,3,0]nonene-5,1,2-dimethylimidazolinium, 1,2,4-trimethylimidazoline, 1-methyl-2-ethyl-imidazoline, 1,4-dimethyl-2-ethylimidazoline, 1-methyl-2-heptylimidazoline, 1-methyl-2-(3'heptyl)imidazoline, 1-methyl-2-dodecylimidazoline, 1,2-dimethyl-1,4,5,6-tetrahydropyrimidine, 1-methylimidazole, and 1-methylbenzimidazole.

The non-aqueous electrolytic solution contains a non-aqueous solvent and a solute (for example, an organic salt) dissolved in the non-aqueous solvent. Examples of the non-aqueous solvent constituting the non-aqueous electrolytic solution include the above-described examples of the non-aqueous solvent. Examples of the solute include an inorganic salt and an organic salt. The organic salt is a salt in which at least one of an anion and a cation contains an organic substance. Examples of the organic salt include trimethylamine maleate, triethylamine borodisalicylate, ethyldimethylamine phthalate, mono 1,2,3,4-tetramethylimidazolinium phthalate, and mono 1,3-dimethyl-2-ethylimidazolinium phthalate.

In order to suppress the dedoping of the dopant, the pH of the liquid component (L) may be set to less than 7 or may be set to 5 or less.

The capacitor element of the electrolytic capacitor of the present disclosure may be a wound type or may be a laminated type. In an example of the wound-type capacitor element, a foil-shaped anode body, a foil-shaped cathode body, and a separator are wound to dispose the separator between the anode body and the cathode body. In an example of a laminated-type capacitor element, a foil-shaped anode body, a foil-shaped cathode body, and a separator are folded in a zigzag manner so as to dispose the separator between the anode body and the cathode body.

The anode body, the cathode body, and the separator of the electrolytic capacitor of the present disclosure are not particularly limited, and known ones may be used. Specific examples thereof will be described below.

(Anode Body)

The anode body includes a dielectric layer on a surface of the anode body. As the anode body, a metal foil having a dielectric layer formed on a surface of the metal foil can be used. The type of metal constituting the metal foil is not particularly limited. From the viewpoint of easy formation of the dielectric layer, examples of metal constituting the metal foil include a valve metal, such as aluminum, tantalum, niobium, or titanium, and an alloy of a valve metal. Preferred examples are aluminum and an aluminum alloy. Usually, the surface of the anode body is roughened, and the dielectric layer is formed on the roughened surface. The electrolyte layer is in contact with the dielectric layer of the anode body.

(Cathode Body)

As the cathode body, a metal foil can be used. The type of metal constituting the metal foil is not particularly limited. Examples of metal constituting the metal foil include a valve metal, such as aluminum, tantalum, niobium, or titanium, and an alloy of a valve metal. Preferred examples are aluminum and an aluminum alloy. On a surface of the cathode body may be provided an anodization film, a film of a metal different from the metal that constitutes the cathode body (different type of metal), or a nonmetal film. Examples of the different type of metal and the nonmetal include metals such as titanium and nonmetals such as carbon.

(Separator)

As the separator, a sheet-shaped material that may be impregnated with an electrolyte can be used, and for example, a sheet-shaped material that has insulating properties and may be impregnated with an electrolyte may be used. The separator may be a woven fabric, a nonwoven fabric, or a porous membrane. Examples of a material for the separator include cellulose, polyethylene terephthalate, polybutylene terephthalate, polyphenylenesulfide, vinylon, nylon, aromatic polyamide, polyimide, polyamideimide, polyetherimide, rayon, and glass.

The electrolyte of the electrolytic capacitor of the present disclosure contains the first compound. The strength of the separator can be improved by this first compound. When a separator having a weak strength (for example, a separator made of cellulose-based natural fibers) is used, characteristics such as withstand voltage may be deteriorated. Deterioration of such characteristics can be suppressed by using the first compound. The effect of reinforcing the separator can be obtained regardless of the type of the separator.

(Method for Manufacturing Electrolytic Capacitor)

An example of the method of the present disclosure for manufacturing an electrolytic capacitor will be described below. According to the manufacturing method, the electrolytic capacitor of the present disclosure can be manufactured. The matters described for the electrolytic capacitor of the present disclosure can be applied to the following manufacturing method, and thus redundant description may be omitted. For example, the constituent elements of the electrolytic capacitor of the present disclosure (constituent elements of the anode body, the cathode body, the separator, and the electrolyte layer) have been described above, and thus redundant description may be omitted. Specifically, the first and second compounds, the first and second conductive polymers, the separator, and the liquid component (L) have been described above, and thus redundant description may be omitted. The matters described below can be applied to the electrolytic capacitor of the present disclosure described above.

An example of the method for manufacturing an electrolytic capacitor will be described below. This manufacturing method includes steps (i) to (iii).

(Step (i))

The step (i) is a step of forming a capacitor element precursor that includes a separator, an anode body, and a cathode body. The anode body and the cathode body each have a foil shape and face each other with the separator disposed between the anode body and the cathode body. The capacitor element precursor is a capacitor element before an electrolyte layer is formed.

The foil-shaped anode body may be formed by a known method. For example, first, a metal foil as a raw material for the anode body is prepared, and the surface of the metal foil is roughened. The roughening can be performed, for example, by etching using a direct current electrolyzing method or an alternating current electrolyzing method. Next, the dielectric layer is formed on the roughened surface of the metal foil. The dielectric layer can be formed, for example, by subjecting the metal foil to an anodizing treatment. Through the anodizing treatment of the metal foil, the surface of the metal foil is oxidized to form the dielectric layer that is an oxide film. Thus, the anode body is formed.

As necessary, a lead terminal for electrical connection is connected to each of the anode body and the cathode body.

When the first electrolytic capacitor is a wound-type capacitor, a capacitor element precursor can be formed, for example, by collectively winding a foil-shaped anode body, a foil-shaped cathode body, and a separator. At this time, the anode body, the cathode body, and the separator are wound to dispose the separator between the anode body and the cathode body.

When the capacitor element is a laminated-type capacitor, a capacitor element precursor can be formed, for example, by collectively folding a foil-shaped anode body, a foil-shaped cathode body, and a separator in a zigzag manner. At this time, the anode body, the cathode body, and the separator are folded to dispose the separator between the anode body and the cathode body.

(Step (ii))

The step (ii) is a step of disposing a first compound inside the capacitor element precursor. The first compound is at least one compound selected from the group consisting of a sugar and a polyhydric alcohol and has a melting point of 50° C. or higher. The step (ii) may be a step of precipitating the first compound inside the capacitor element precursor. Thus, in the following description, "disposing" may be read as "precipitating".

The step (ii) may include a step (ii-a) and a step (ii-b). The step (ii-a) is a step of impregnating the capacitor element precursor with a first aqueous treatment solution containing the first compound.

The step (ii-a) can be performed, for example, by immersing the capacitor element precursor in the first aqueous treatment solution. The immersion time is not limited, and may be 1 minute or longer and shorter than 20 minutes. The entire capacitor element precursor may be immersed in the first aqueous treatment solution, or only a part of the capacitor element precursor may be immersed in the first aqueous treatment solution. For example, only 50% or less of the capacitor element precursor in a longitudinal direction (axial direction in the case of a wound body) may be immersed in the first aqueous treatment solution.

The step (ii-a) may be performed at room temperature, or may be performed at a temperature other than the room temperature (for example, a temperature higher than room temperature). The step (ii-a) may be performed under atmospheric pressure, or may be performed in an environment other than the atmospheric pressure (for example, under reduced pressure).

The first aqueous treatment solution is a treatment solution containing water. The proportion of water in the liquid (solvent) constituting the first aqueous treatment solution ranges, for example, from 50 mass % to 100 mass %, inclusive. Usually, the first compound is dissolved in the first aqueous treatment solution. That is, the first aqueous treatment solution may be a solution in which the first compound is dissolved. In a typical example, the first aqueous treatment solution is an aqueous solution of the first compound.

The content proportion (concentration) of the first compound in the first aqueous treatment solution (for example, an aqueous solution of the first compound) may range from 3 mass % to 50 mass %, inclusive (for example, from 5 mass % to 15 mass %, inclusive). The first aqueous treatment solution may contain a component other than the first compound, as necessary.

The first aqueous treatment solution may not contain a polymer. For example, the first aqueous treatment solution may not contain the first conductive polymer. Since the viscosity of the first aqueous treatment solution not containing a polymer is low, the impregnation into the capacitor element precursor becomes easier. The polymer described herein means a polymer having a weight average molecular weight of 1000 or more.

The step (ii-b) is a step of drying the impregnated first aqueous treatment solution to dispose the first compound inside the capacitor element precursor. The drying is usually performed by heating. The step (ii-b) may be performed under atmospheric pressure, or may be performed in an environment other than the atmospheric pressure (for example, under reduced pressure). The drying temperature in the step (ii-b) may be a temperature equal to or higher than the melting point of the first compound, and further may be a temperature (for example, 100° C. or higher) equal to or higher than the boiling point of the first aqueous treatment solution under the pressure for performing the drying in the step (ii-b). In a preferred example, the drying temperature in the step (ii-b) is a temperature (for example, 100° C. or higher) higher than the boiling point of the first aqueous treatment solution under the pressure for performing the drying in the step (ii-b) and a temperature equal to or higher than the melting point of the first compound under the pressure for performing the drying in the step (ii-b) and a temperature lower than the boiling point. When the drying is performed at a temperature equal to or higher than the melting point of the first compound, the permeability of the first compound into the capacitor element precursor can be enhanced.

The step (ii) may be repeatedly performed as necessary. The amount of the first compound to be precipitated can be increased by repeating the step (ii).

The step (ii) may be performed by impregnating the capacitor element precursor with a melt of the first compound in a state where the temperatures of the first compound and the capacitor element precursor are increased to a temperature equal to or higher than the melting point of the first compound.

(Step (iii))

The step (iii) is a step of forming a first layer containing a first conductive polymer inside the capacitor element precursor after the step (ii). Hereinafter, the first layer formed in the step (iii) may be referred to "first layer (CL1)". The first layer (CL1) is a layer that may be the electrolyte layer of the first electrolytic capacitor. Further, the first layer (CL1) is a layer that may be the first layer of the electrolyte layer of the second electrolytic capacitor.

The step (iii) includes a step (iii-a) and a step (iii-b). The step (iii-a) is a step of impregnating the capacitor element precursor with a first aqueous dispersion liquid containing the first conductive polymer after the step (ii).

The step (iii-a) can be performed, for example, by immersing the capacitor element precursor in the first aqueous dispersion liquid. The immersion time is not limited, and may be from 1 second to 30 minutes, inclusive. The entire capacitor element precursor may be immersed in the first aqueous dispersion liquid, or only a part of the capacitor element precursor may be immersed in the first aqueous dispersion liquid. For example, only 50% or less of the capacitor element precursor in a longitudinal direction (axial direction in the case of a wound body) may be immersed in the first aqueous dispersion liquid.

The step (iii-a) may be performed at room temperature, or may be performed at a temperature other than the room temperature (for example, a temperature higher than room temperature). The step (iii-a) may be performed under atmospheric pressure, or may be performed in an environment other than the atmospheric pressure (for example, under reduced pressure).

The first aqueous dispersion liquid is a treatment solution containing water. The proportion of water in the aqueous liquid (dispersion medium) constituting the first aqueous dispersion liquid ranges, for example, from 2 mass % to 100 mass %, inclusive. The aqueous liquid may be water. The first conductive polymer is dispersed in the aqueous liquid. That is, the first aqueous dispersion liquid is a suspension liquid in which the first conductive polymer is dispersed in the aqueous liquid.

The content proportion (concentration) of the first conductive polymer in the first aqueous dispersion liquid may range from 0.1 mass % to 20 mass %, inclusive (for example, from 0.5 mass % to 3 mass %, inclusive).

The viscosity of the first aqueous dispersion liquid may range from 1 mPa·s to 100 mPa·s, inclusive, or may range from 1 mPa·s to 40 mPa·s, inclusive (for example, from 1 mPa·s to 25 mPa·s, inclusive). The lower the viscosity of the first aqueous dispersion liquid, the easier the impregnation into the capacitor element precursor.

It is preferable that the first aqueous dispersion liquid does not contain the first compound. When the first compound is not added to the first aqueous dispersion liquid, the viscosity of the first aqueous dispersion liquid can be reduced. Even when the first aqueous dispersion liquid contains the first compound, the first compound is preferably contained in a range in which the viscosity of the first aqueous dispersion liquid is less than or equal to a certain value (for example, 40 mPa·s or less or 25 mPa·s or less).

As described above, a dopant may be added to the first conductive polymer. The first aqueous dispersion liquid may contain a component other than the first conductive polymer and the dopant, as necessary.

The step (iii-b) is a step of drying the impregnated first aqueous dispersion liquid to form the first layer (CL1). When a step (X) described below is not performed (that is, when the first electrolytic capacitor is manufactured), the first layer (CL1) is in contact with the separator. In this case, the first layer (CL1) may be in contact with the anode body and/or the cathode body. Typically, the first layer (CL1) contains the first conductive polymer as a main constituent element.

The method for drying the first aqueous dispersion liquid is not particularly limited. The drying may be performed in at least one atmosphere selected from a drying atmosphere, a reduced pressure atmosphere, and a heating atmosphere, and usually at least heating is performed. In a preferred example, the heating temperature in the step (iii-b) is a temperature (for example, 100° C. or higher) equal to or higher than the boiling point of the first aqueous dispersion liquid under the pressure for performing the drying in the step (iii-b) and a temperature lower than the melting point of the first compound under the pressure for performing the drying in the step (iii-b). Alternatively, the heating temperature in the step (iii-b) may be a temperature (for example, 100° C. or higher) higher than the boiling point of the first aqueous dispersion liquid under the pressure for performing the drying in the step (iii-b) and a temperature equal to or higher than the melting point of the first compound under the pressure for performing the drying in the step (iii-b) and a temperature lower than the boiling point.

In order to realize superior characteristics (for example, low ESR), it is necessary to increase the content proportion of the conductive polymer in the electrolyte layer. For this purpose, it is important to enhance the fixability of the conductive polymer. As one of methods for enhancing the fixability of the conductive polymer, it is considered to add a polyhydric alcohol or the like to the aqueous dispersion liquid of the conductive polymer. However, when a polyhydric alcohol or the like is added to the aqueous dispersion liquid, the viscosity of the aqueous dispersion liquid increases, and thus impregnation with the aqueous dispersion liquid becomes difficult. In the manufacturing method of the present disclosure, after the treatment with the first aqueous treatment solution containing the first compound is performed, impregnation with the first aqueous dispersion liquid is performed. Hence, impregnation with the first aqueous dispersion liquid becomes easy. By disposing the first compound inside the capacitor element precursor in advance, the first conductive polymer to be impregnated thereafter can be firmly fixed. As a result, an electrolytic capacitor with superior characteristics can be manufactured.

As an example of the manufacturing method of the present disclosure, a first manufacturing method (M1) and a second manufacturing method (M2) will be described below. The first electrolytic capacitor can be manufactured by the first manufacturing method (M1), and the second electrolytic capacitor can be manufactured by the second manufacturing method (M2).

In the first manufacturing method (M1), the first compound is disposed on at least a part of at least one surface (S1) selected from the group consisting of a surface of the anode body, a surface of the cathode body, and a surface of the separator.

In the first manufacturing method (M1), in the step (ii-a), the capacitor element precursor may be impregnated with the first aqueous treatment solution to make the first aqueous treatment solution be in contact with at least a part of at least one surface (S1) selected from the group consisting of a surface of the anode body, a surface of the cathode body, and a surface of the separator. In the step (ii-b), the first compound may be disposed on at least a part of the at least one surface (S1) by drying the impregnated first aqueous treatment solution. According to this configuration, the step (iii) is performed in a state where the first compound is precipitated on at least a part of the surface (S1) so that the first layer (CL1) is formed. The first layer (CL1) to be formed has an unevenly distributed portion in which the first compound is unevenly distributed more in at least a part of at least one portion selected from the group consisting of a portion in contact with the anode body, a portion in contact with the cathode body, and a portion in contact with the separator than in a portion other than the at least a part of the portion. Thus, the first conductive polymer in the first layer (CL1) is fixed by the first compound. The step (ii-a) can be performed by treating the capacitor element precursor with the first aqueous treatment solution after the capacitor element precursor is assembled and before the capacitor element precursor is impregnated with the aqueous dispersion liquid of the conductive polymer.

(Step (X))

The second manufacturing method (M2) may further include a step (X) between the step (i) and the step (ii). The step (X) includes a step (X-a) and a step (X-b). The step (X-a) is a step of impregnating the capacitor element precursor with a second aqueous dispersion liquid containing a second conductive polymer. The step (X-b) is a step of drying the impregnated second aqueous dispersion liquid to form a second layer containing the second conductive polymer on at least a part of surfaces of the anode body and the cathode body. This second layer may be referred to "second layer (CL2)" below. The second layer (CL2) is a conductive polymer layer.

The step (X-a) and the step (X-b) can be performed in the same manner as in the step (iii-a) and the step (iii-b), respectively, except that the second conductive polymer is used instead of the first conductive polymer. For example, the second aqueous dispersion liquid can be prepared in the same manner as in the first aqueous dispersion liquid, except that the second conductive polymer is used instead of the first conductive polymer. As described above, the second conductive polymer may be the same as or different from the first conductive polymer. The execution conditions of the step (iii) and the execution conditions of the step (X) may be the same as or different from each other.

In an example, the average particle diameter of the second conductive polymer may be smaller than the average particle diameter of the first conductive polymer. The average particle diameter described herein is a volume-based median diameter ($D_{50}$). The median diameter ($D_{50}$) is determined, for example, using a laser diffraction and scattering type particle size distribution measuring apparatus. The average particle diameter of the first conductive polymer may range from 0.1 μm to 0.5 μm, inclusive. The average particle diameter of the second conductive polymer may range from 0.01 μm to 0.2 μm, inclusive. In these ranges, the average particle diameter of the second conductive polymer may be smaller than the average particle diameter of the first conductive polymer.

In the manufacturing method (M2), the first compound is disposed on the second layer (CL2) in the step (ii).

In the manufacturing method (M2), the capacitor element precursor may be impregnated with the first aqueous treatment solution in the step (ii-a) after the step (X), and the impregnated first aqueous treatment solution may be dried to dispose the first compound on a surface of the second layer (CL2) in the step (ii-b). According to this configuration, the step (iii) is performed in a state where the first compound is precipitated on the surface of the second layer (CL2) so that the first layer (CL1) is formed. Thus, the electrolyte layer of the second electrolytic capacitor has the unevenly distributed portion in which the first compound is unevenly distributed portion more in at least a part of a portion in contact with an interface between the first layer (CL1) and the second layer (CL2) than in a portion other than the at least a part of the at least one portion. According to this configuration, the conductive polymer is firmly fixed at the interface between the first layer (CL1) and the second layer (CL2).

In the manufacturing method (M2), the second aqueous dispersion liquid contains a second compound that is at least one compound selected from the group consisting of a sugar and a polyhydric alcohol and has a melting point of 50° C. or higher. In this case, since the viscosity of the second aqueous dispersion liquid increases, the impregnation property of the second aqueous dispersion liquid is not high. However, the filling ratio of the first conductive polymer can be increased by performing the step (ii) and the step (iii) thereafter. Thus, an electrolytic capacitor with superior characteristics is obtained.

The manufacturing method (M2) may include a step (Y) of disposing a second compound inside the capacitor element precursor, between the step (i) and the step (X). The second compound is at least one compound selected from the group consisting of a sugar and a polyhydric alcohol and has a melting point of 50° C. or higher.

(Step (Y))

The step (Y) includes a step (Y-a) and a step (Y-b). The step (Y-a) is a step of impregnating the capacitor element precursor with a second aqueous treatment solution containing the second compound to make the second aqueous treatment solution be in contact with at least a part of at least one surface (S2) selected from the group consisting of a surface of the anode body, a surface of the cathode body, and a surface of the separator. The step (Y-b) is a step of drying the impregnated second aqueous treatment solution to dispose the second compound on at least a part of at least one surface (S2). The step (Y-a) and the step (Y-b) can be performed in the same manner as in the step (ii-a) and the step (ii-b), respectively, except that the second compound is used instead of the first compound. For example, the second aqueous treatment solution can be prepared in the same manner as in the first aqueous treatment solution, except that the second compound is used instead of the first compound. As described above, the second compound may be the same as or different from the first compound. The execution conditions of the step (ii) and the execution conditions of the step (Y) may be the same as or different from each other.

In the manufacturing method of the present disclosure, the drying in the step (iii-b) may be performed at a temperature equal to or higher than the melting point of the first compound. According to this drying condition, the first compound disposed by the step (ii) can be melted, and fixability by the first compound can be further enhanced.

Similarly, when the manufacturing method of the present disclosure includes the step (Y) and the step (X), the drying in the step (X-b) may be performed at a temperature equal to or higher than the melting point of the second compound.

In the manufacturing method of the present disclosure, the step (iii) may be repeated multiple times. In order to realize superior characteristics (for example, low ESR), it is preferable to increase the content proportion of the first conductive polymer in the electrolyte layer. The content proportion of the first conductive polymer can be increased by repeating the step (iii) multiple times. The number of times of the step (iii) to be repeated is not particularly limited. The number of times of the step (iii) performed in the manufacturing method of the present disclosure may range from 1 to 5, inclusive (for example, from 2 to 3, inclusive). When the step (iii) is repeated, a plurality of the steps (iii) may be the same as or different from each other. For example, the preparation conditions (such as components and concentrations) and the drying concentrations of the first aqueous dispersion liquid in each step (iii) may be the same as or different from each other.

Similarly, when the manufacturing method of the present disclosure includes the step (X), the step (X) may be repeated multiple times.

The first layer (CL1) and the second layer (CL2) may be used as the electrolyte layer without adding any changes. Alternatively, the first layer (CL1) and the second layer (CL2) may be impregnated with the above-described liquid component (L) to form the electrolyte layer. When the step (iii) is repeated multiple times, the liquid component (L) may be impregnated after all the steps are completed. Impregnation with the liquid component (L) may be performed, for example, in such a manner that the capacitor element precursor obtained after completion of the step (iii) is immersed in the liquid component (L).

At least a part of the first compound precipitated on the surface of the constituent element (anode body or the like) of the capacitor element precursor by the step (ii) is dissolved in the first aqueous dispersion liquid in the treatment of the step (iii-a). A part of the first compound that has not been dissolved in the first aqueous dispersion liquid remains on the surface precipitated in the step (ii). Most of some of the first compound that has been dissolved in the first aqueous dispersion liquid remains in the vicinity of the surface. As a result, a portion in which the first compound is unevenly distributed is generated in the vicinity of the surface.

The first compound present in the vicinity of the surface helps the first conductive polymer to adhere to the surface. Thus, according to the manufacturing method, the amount of the first conductive polymer in the electrolyte layer can be increased, and superior characteristics (for example, low ESR) can be achieved. The stability of the electrolyte layer can be enhanced, and thus an electrolytic capacitor having high reliability is obtainable.

When the step (iii) is repeated, it is particularly important to prevent the first conductive polymer, which is filled in the capacitor element precursor by the step (iii) prior to the impregnation step of the step (iii-a), from falling off. Thus, when the step (iii) is repeated, it is particularly important to perform the step (ii).

As described above, the electrolyte layer is formed. That is, the capacitor element including the electrolyte layer is formed as described above.

The electrolytic capacitors (first and second electrolytic capacitors) of the present disclosure can be manufactured using the capacitor element obtained as described above.

The method for manufacturing an electrolytic capacitor using a capacitor element is not particularly limited, and a known method may be applied. For example, a capacitor element may be put in a case and then sealed.

Hereinafter, an example of the electrolytic capacitor according to the present disclosure will be specifically described with reference to the drawings; however, the electrolytic capacitor of the present disclosure is not limited to the following drawings. The above-described constituent elements can be applied to constituent elements of the electrolytic capacitor as the example to be described below. The constituent elements of the electrolytic capacitor as the example to be described below can be changed based on the above-described description. Matters to be described below may be applied to the above-described exemplary embodiment. Similar parts will be denoted by the common reference marks and redundant description may be omitted.

First Exemplary Embodiment

Figure 1:
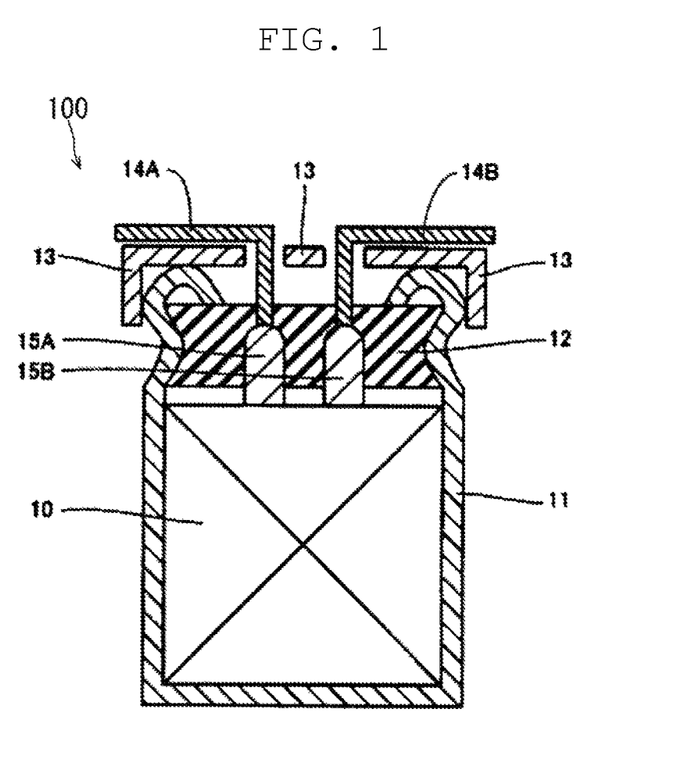
FIG. 1 is a sectional view schematically illustrating an example of an electrolytic capacitor of the present disclosure.
Figure 2:
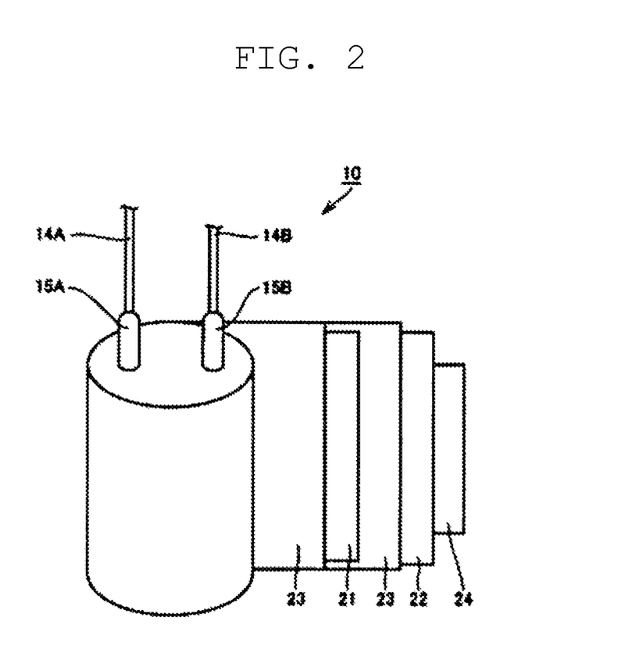
FIG. 2 is a view schematically illustrating a part of the electrolytic capacitor illustrated in FIG. 1.

In the first exemplary embodiment, an example of the electrolytic capacitor according to the present disclosure will be described. FIG. 1 schematically illustrates a cross-section of an example of electrolytic capacitor 100 of the first exemplary embodiment. FIG. 2 is a schematic view of a partially developed capacitor element included in electrolytic capacitor 100 illustrated in FIG. 1.

As illustrated in FIG. 1, electrolytic capacitor 100 includes, for example, capacitor element 10, bottomed case 11 that houses capacitor element 10, sealing member 12 that closes an opening of bottomed case 11, seat plate 13 that covers sealing member 12, lead wires 14A and 14B led out from sealing member 12 and penetrating seat plate 13, lead tabs 15A and 15B (not illustrated) respectively connecting lead wires 14A and 14B and electrodes of capacitor element 10. Capacitor element 10 is housed in bottomed case 11. When capacitor element 10 contains the liquid component (L), the liquid component (L) is also housed in bottomed case 11. Bottomed case 11 is, at a part near an opening end, processed inward by drawing, and is, at the opening end of bottomed case 11, curled to swage sealing member 12.

Capacitor element 10 includes foil-shaped anode body 21 having a dielectric layer on a surface of the anode body, foil-shaped cathode body 22, and separator 23 and an electrolyte layer (not illustrated) disposed between the anode body and the cathode body. Anode body 21 and cathode body 22 are wound with separator 23 disposed between the anode body and the cathode body. The outermost circumference of the wound body is fixed with winding stop tape 24. FIG. 2 illustrates the wound body that is partially developed before the outermost circumference of the wound body is fixed.

Figure 3:
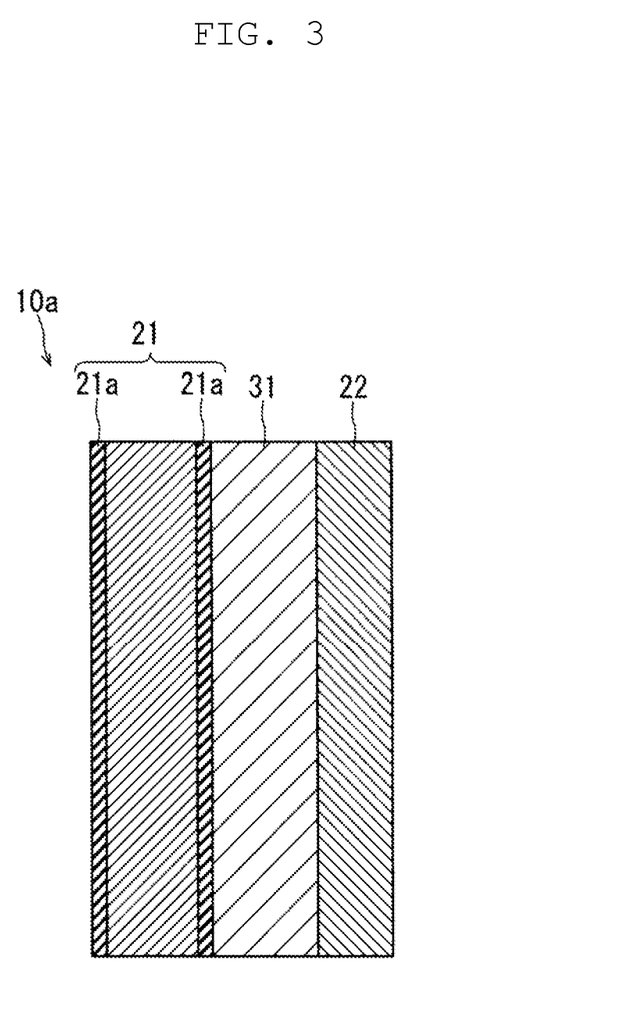
FIG. 3 is a sectional view schematically illustrating a part of an example of a capacitor element included in the electrolytic capacitor of the present disclosure.

FIG. 3 is a sectional view schematically illustrating a part of an example of a capacitor element included in the first electrolytic capacitor. Capacitor element 10a of FIG. 3 includes anode body 21, cathode body 22, and electrolyte layer 31 and a separator (not illustrated) disposed between the anode body and the cathode body. Dielectric layer 21*a* is formed on the surface of anode body 21. Electrolyte layer 31 contains the first conductive polymer and the first compound. As described above, electrolyte layer 31 includes an unevenly distributed portion (not illustrated) of the first compound. Electrolyte layer 31 may contain the above-described liquid component (L).

Figure 4:
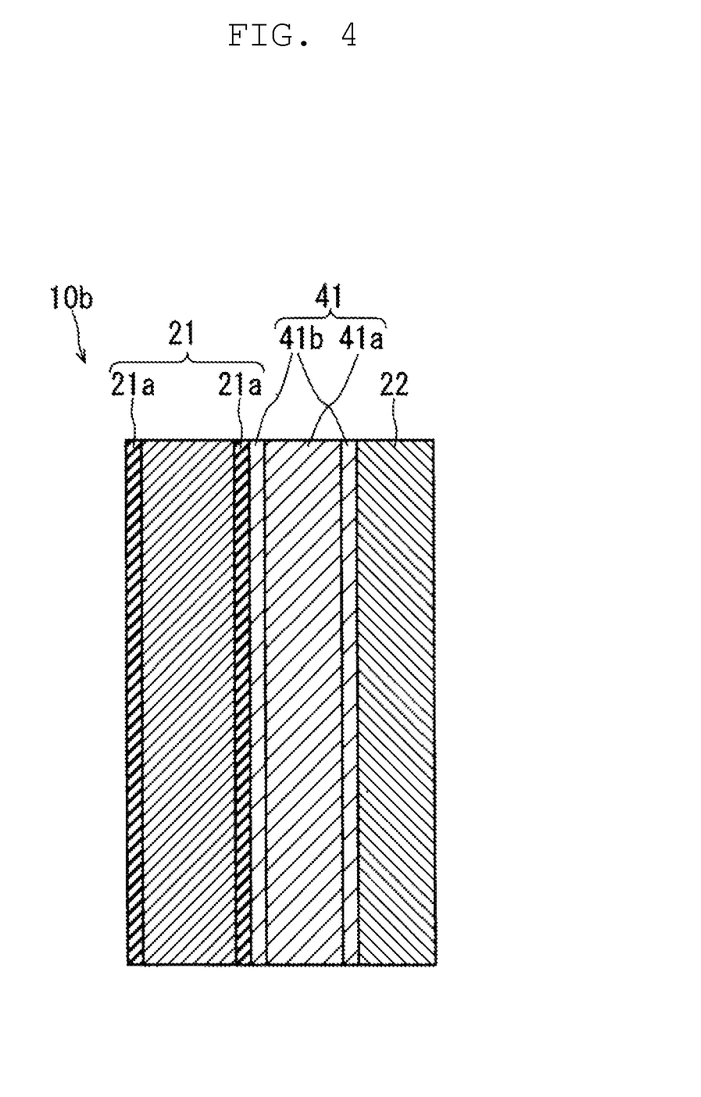
FIG. 4 is a sectional view schematically illustrating a part of another example of the capacitor element included in the electrolytic capacitor of the present disclosure.

FIG. 4 is a sectional view schematically illustrating a part of an example of a capacitor element included in the second electrolytic capacitor. Capacitor element 10*b* of FIG. 4 includes anode body 21, cathode body 22, and electrolyte layer 41 and a separator (not illustrated) disposed between the anode body and the cathode body. Electrolyte layer 41 includes second layer 41*b* and first layer 41*a* formed on at least second layer 41*b*. The arrangement of the electrolyte layer illustrated in FIG. 4 is an example, and the present disclosure is not limited to the arrangement of FIG. 4. First layer 41*a* contains the first conductive polymer. Second layer 41*b* contains the second conductive polymer. As described above, electrolyte layer 41 includes an unevenly distributed portion (not illustrated) of the first compound. Electrolyte layer 41 may contain the above-described liquid component (L).

EXAMPLES

Hereinafter, an exemplary embodiment of the present disclosure will be described in more detail by means of Examples. In this Example, a plurality of electrolytic capacitors (capacitors A1 to A7 and capacitors C1 to C6) were produced and evaluated. The methods for manufacturing and evaluating these capacitors will be described below. In the description of the method for producing a capacitor of Comparative Example, conditions different from the conditions of the step (ii) and the step (iii) described above may be used, but for convenience, these are also described as the step (ii) and the step (iii).

[Production of Capacitor A1]

A capacitor A1 is a wound-type electrolytic capacitor (diameter 10 mm×length 10 mm) having a rated voltage of 35 V and a rated capacitance of 270 g. The capacitor A1 was produced by the following procedure.

(Preparation of Cathode Body)

An aluminum foil (Al foil) having a thickness of 50 μm was used for the cathode body.

(Preparation of Anode Body)

An Al foil having a thickness of 120 μm was prepared. The Al foil was subjected to a direct current etching treatment to roughen a surface. Next, the Al foil was subjected to an anodizing treatment to form a dielectric layer (thickness: about 70 nm), thereby obtaining an anode body. A dielectric layer was formed by performing an anodizing treatment at 70° C. for 5 hours while applying a voltage of 50 V to the Al foil with the Al foil immersed in an ammonium adipate solution. Then, the anode body was cut into a predetermined size to prepare an anode body of the capacitor A1.

(Production of Wound Body (Step (i)))

An anode lead tab and a cathode lead tab to which a lead wire was connected were connected to the prepared anode body and cathode body, respectively. The anode body and the cathode body were wound with the separator interposed between the anode body and the cathode body, and the outer surface was fixed with a winding stop tape. As the separator, a nonwoven fabric made of aramid (aromatic polyamide fiber) which is a synthetic fiber was used. In this way, a wound body (capacitor element precursor) was produced. A dielectric layer was formed mainly on an end surface of the anode body by performing a re-anodizing treatment at 70° C. for 60 minutes while applying a voltage of 50 V to the anode body with the produced wound body immersed in an ammonium adipate solution.

(Preparation of First Aqueous Treatment Solution)

A mannitol aqueous solution having a concentration of 10 mass % was prepared by dissolving mannitol in ion-exchanged water. The viscosity of the obtained mannitol aqueous solution was measured and found to be 5 mPa·s or less.

(Preparation of First Aqueous Dispersion Liquid)

By dissolving 3,4-ethylenedioxythiophene and polystyrenesulfonic acid as a dopant in ion-exchanged water, these mixed solution was prepared. While the obtained mixed solution was being stirred, iron(III) sulfate (oxidant) that had been dissolved in ion-exchanged water was added to the mixed solution to cause a polymerization reaction. After the reaction, the obtained reaction solution was dialyzed to remove unreacted monomers and an excessive oxidant, thereby obtaining a dispersion liquid (first aqueous dispersion liquid) containing poly(3,4-ethylenedioxythiophene) doped with about 5 mass % of polystyrenesulfonic acid (PSS). Hereinafter, poly(3,4-ethylenedioxythiophene) doped with about 5 mass % of polystyrenesulfonic acid (PSS) may be referred to "PEDOT:PSS". The dispersion liquid in which PEDOT:PSS is dispersed may be referred to "PEDOT:PSS dispersion liquid". The first aqueous dispersion liquid having a concentration of PEDOT:PSS of 2 mass % was prepared using this PEDOT:PSS dispersion liquid. The viscosity of the obtained dispersion liquid was measured and found to be 25 mPa·s.

(Step (ii))

First, the first aqueous treatment solution was disposed in a container. Next, a wound body (capacitor element precursor) was immersed in the first aqueous treatment solution in the container for 5 minutes at room temperature under atmospheric pressure. At this time, the wound body was immersed in the first aqueous treatment solution from the side to which the lead tab was not connected (the same applies to another immersion step described below). Then, the wound body was pulled up from the first aqueous treatment solution. In this way, the wound body was impregnated with the first aqueous treatment solution. Then, the wound body was dried in a drying furnace at 180° C. for 30 minutes, thereby drying the first aqueous treatment solution. In this way, the first compound was disposed inside the wound body.

(Step (iii))

First, the first aqueous dispersion liquid was disposed in a container. Next, the wound body was immersed in the first aqueous dispersion liquid in the container for 15 minutes at room temperature in a reduced pressure atmosphere (40 kPa), and then the wound body was pulled up from the first aqueous dispersion liquid. In this way, the wound body was impregnated with the first aqueous dispersion liquid. Then, the wound body was dried in a drying furnace at 60° C. for 30 minutes, and subsequently dried at 125° C. for 15 minutes. Thus, the first aqueous dispersion liquid was dried. In this way, the first layer (conductive polymer layer) was formed.

(Impregnation with Electrolytic Solution)

After the step (iii), the wound body was impregnated with the electrolytic solution at room temperature under atmospheric pressure. As the electrolytic solution, a solution obtained by mixing polyethylene glycol, γ-butyrolactone, sulfolane, and mono(ethyldimethylamine) phthalate (solute) at a mass ratio of polyethylene glycol:γ-butyrolactone:sulfolane:mono (ethyldimethylamine) phthalate=25:25:25:25 was used. In this way, the capacitor element including the electrolyte layer was obtained. This capacitor element was sealed to complete the electrolytic capacitor. Then, an aging treatment was performed at 150° C. for 1 hour while rated voltage was being applied. In this way, capacitor A1 was obtained.

[Capacitor A2]

Capacitor A2 was produced under the same conditions as in capacitor A1, except that the separator was changed. As the separator, a nonwoven fabric of cellulose-based natural fibers was used.

[Capacitor A3]

Capacitor A3 was performed by the same method as in capacitor A1, except that the step (X) was performed. The step (X) was performed as follows.

The PEDOT:PSS dispersion liquid described in the production of capacitor A1 was used as the second aqueous dispersion liquid. Impregnation and drying were performed using this second aqueous dispersion liquid under the same conditions as in the step (iii) of capacitor A1 to form the second layer (conductive polymer layer). In this way, the step (X) was performed. Then, the step (ii) and the step (iii) were performed under the same conditions as in capacitor A1 to form the first layer on the second layer. Then, capacitor A3 was produced by the same process as in capacitor A1.

[Capacitor A4]

Capacitor A4 was performed by the same method as in capacitor A1, except that the above-described step (X) was performed. The step (X) was performed as follows.

Mannitol was dissolved in the PEDOT:PSS dispersion liquid described in the production of capacitor A1 to prepare the second aqueous dispersion liquid. The concentration of PEDOT:PSS of the second aqueous dispersion liquid was set to 2 mass %, and the concentration of mannitol was set to 10 mass %. The viscosity of the obtained dispersion liquid was measured and found to be 45 mPa·s.

Impregnation and drying were performed using this second aqueous dispersion liquid under the same conditions as in the step (iii) of capacitor A1 to form the second layer (conductive polymer layer). In this way, the step (X) was performed. Then, the step (ii) and the step (iii) were performed under the same conditions as in capacitor A1 to form the first layer on the second layer. Then, capacitor A4 was produced by the same process as in capacitor A1.

[Capacitor A5]

Capacitor A5 was produced under the same conditions as in capacitor A1, except that the step (iii) of capacitor A1 was continuously performed twice under the same conditions.

[Capacitor A6]

Capacitor A6 was performed by the same method as in capacitor A1, except that another step (iii) was further performed after the step (iii). Specifically, capacitor A6 was produced by the following method.

The steps up to the step (iii) of capacitor A1 were performed in the same manner as in the production of capacitor A1. Then, another step (iii) was further performed. As the first aqueous dispersion liquid, the same aqueous dispersion liquid as the second aqueous dispersion liquid (dispersion liquid containing PEDOT:PSS and mannitol) used in the production of capacitor A4 was used. Impregnation and drying were performed using this dispersion liquid under the same conditions as in the step (iii) of capacitor A1. Then, capacitor A6 was produced by the same process as in capacitor A1.

[Capacitor A7]

Capacitor A7 was performed by the same method as in capacitor A1, except that the step (Y) and the step (X) were performed. The step (Y) and the step (X) were performed under the same conditions as in the step (ii) and the step (iii) of capacitor A1, respectively.

In this way, the second layer was formed, and then the step (ii) and the step (iii) were performed under the same conditions as in capacitor A1 to form the first layer on the second layer. Then, capacitor A7 was produced by the same process as in capacitor A1.

[Capacitor C1]

Capacitor C1 was produced under the same conditions as in capacitor A1, except that the step (ii) was not performed.

[Capacitor C2]

Capacitor C1 was produced under the same conditions as in capacitor A1, except that the step (ii) was not performed and the dispersion liquid in the step (iii) was changed. As the dispersion liquid of the step (iii), the same aqueous dispersion liquid as the second aqueous dispersion liquid (dispersion liquid containing PEDOT:PSS and mannitol) used in the production of capacitor A4 was used.

[Capacitor C3]

Capacitor C3 was produced under the same conditions as in capacitor A1, except that the step (ii) was not performed and the separator was different. As the separator, the same separator made of natural fibers as the separator used in capacitor A2 was used.

[Capacitor C4]

Capacitor C4 was produced under the same conditions as in capacitor A1, except that the step (ii) was not performed and the step (iii) was continuously performed twice.

[Capacitor C5]

Capacitor C5 was produced under the same conditions as in capacitor A1, except that the step (ii) was not performed, the step (iii) was performed under conditions different from those of the step (iii) of capacitor A1, and then the step (iii) was performed under the same conditions as in the step (iii) of capacitor A1. The first step (iii) was performed under the same conditions as in the step (iii) of capacitor A1, except that the second aqueous dispersion liquid (dispersion liquid containing PEDOT:PSS and mannitol) used in the production of capacitor A4 was used.

[Capacitor C6]

Capacitor C6 was produced under the same conditions as in capacitor A1, except that the step (ii) was not performed, and the step (iii) was performed under the same conditions as in the step (iii) of capacitor A1, and then the step (iii) was performed under different conditions. The second step (iii) was performed under the same conditions as in the step (iii) of capacitor A1, except that the second aqueous dispersion liquid (dispersion liquid containing PEDOT:PSS and mannitol) used in the production of capacitor A4 was used.

(Evaluation of Filling State)

In the process of manufacturing the capacitor, how much the conductive polymer was filled in the capacitor element was visually evaluated after the final step (iii) was completed. Specifically, how much the conductive polymer was filled on the side to which the lead tab was connected in the capacitor element precursor was visually determined. A case where the filling was very good was evaluated as "S", a case where the filling was good was evaluated as "A", and a case where the filling was insufficient was evaluated as "B".

The identification of the first compound (and the second compound described below) in the electrolyte layer and the distribution of the first compound (and the second compound described below) in the electrolyte layer can be examined, for example, by the following methods. The identification of the first compound can be performed using a microscopic FT-IR analyzer (Nicolet-iN10 manufactured by Thermo Fisher Scientific). As for the distribution of the first compound, first, the electrolyte layer (capacitor element) is cut into a plurality of portions, and the first compound present in each portion is extracted with a water solvent. Then, the distribution of the first compound in each portion can be determined by quantifying the extracted first compound.

(Evaluation of Characteristics)

The equivalent series resistance (ESR) of the electrolytic capacitor produced as described above was measured. ESR was measured using an LCR meter for four-terminal measurement in an environment of 20° C. As for ESR, an initial value after production and a value after the electrolytic capacitor was left to stand at a high temperature (left to stand at 145° C. for 250 hours) were measured. As an index of reliability, a reliability evaluation value F was determined by the following formula.

Reliability evaluation value $F=(ESR$ value after being left to stand$)/($Initial $ESR$ value$)$ The breakdown withstand voltage was measured for capacitors A1, A2, and C3.

Specifically, the breakdown withstand voltage was also measured by applying a voltage at an increasing rate of 1.0 V/s until an excess current of 0.5 A flowed. The measurement results and some of the manufacturing conditions of the electrolytic capacitor are shown in Table 1. In Table 1, "PEDOT:PSS mixed" means that the aqueous dispersion liquid is a dispersion liquid containing PEDOT:PSS and mannitol.

30 minutes. The drying in the step (iii-b) and the step (X-b) was performed under the conditions of 60° C. for 30 minutes and 125° C. for 15 minutes. As described above, the viscosity of the mannitol aqueous solution was 5 mPa·s or less, the viscosity of the PEDOT:PSS dispersion liquid was 25 mPa·s, and the viscosity of the dispersion liquid containing PEDOT:PSS and mannitol was 45 mPa·s. The melting point of mannitol is about 165° C. to 169° C.

The ESR value is preferably low. The ESR value is preferably 15 mΩ or less (for example, in a range from 10 mΩ to 15 mΩ, inclusive) and more preferably 12 mΩ or less (for example, in a range from 8 mΩ to 12 mΩ, inclusive). The breakdown withstand voltage is preferably high, and is preferably 70 V or more (for example, in a range from 70 V to 90 V, inclusive). The reliability evaluation value F is preferably small. The evaluation value F is preferably 1.3 or less (for example, in a range from 1 to 1.3, inclusive) and more preferably 1.2 or less (for example, in a range from 1 to 1.2, inclusive).

As shown in Table 1, the electrolytic capacitors of the present disclosure (capacitors A1 to A7) manufactured by the manufacturing method of the present disclosure in which the step (ii) and the step (iii) are performed showed superior characteristics. Capacitor A7 subjected to the step (Y) and the step (X) had particularly superior characteristics.

When capacitor C1 and capacitor C3 manufactured without performing the step (ii) were compared with each other, in the case of not performing the step (ii), the breakdown withstand voltage was deteriorated in the capacitor using the separator made of natural fibers (separator having a weak strength). On the other hand, when capacitor A1 and capacitor A2 manufactured by performing the step (ii) were compared with each other, a high breakdown withstand voltage was exhibited regardless of the type of the separator.

When capacitor A3 and capacitor A4 were compared with each other, the reliability evaluation value F of capacitor A4

TABLE 1

| Capacitor | Separator | Step (Y-a) | Step (X-a) | Step (ii-a) | Step (iii-a) | Filling state | ESR (mΩ) | Breakdown withstand voltage (V) | Reliability evaluation value F |
|---|---|---|---|---|---|---|---|---|---|
| A1 | Synthetic | | | Mannitol | PEDOT:PSS | S | 12 | 70 | 1.12 |
| A2 | Natural | | | Mannitol | PEDOT:PSS | S | 15 | 71 | 1.17 |
| A3 | Synthetic | | PEDOT:PSS | Mannitol | PEDOT:PSS | S | 14 | — | 1.24 |
| A4 | Synthetic | | PEDOT:PSS mixed | Mannitol | PEDOT:PSS | S | 12 | — | 1.10 |
| A5 | Synthetic | | | Mannitol | PEDOT:PSS (Step (iii) twice) | S | 12 | — | 1.16 |
| A6 | Synthetic | | | Mannitol | PEDOT:PSS/once PEDOT:PSS mixed: once (Step (iii) twice) | A | 13 | — | 1.13 |
| A7 | Synthetic | Mannitol | PEDOT:PSS | Mannitol | PEDOT:PSS | S | 9 | — | 1.09 |
| C1 | Synthetic | | | | PEDOT:PSS | B | 29 | — | 2.70 |
| C2 | Synthetic | | | | PEDOT:PSS mixed | B | 22 | — | 1.50 |
| C3 | Natural | | | | PEDOT:PSS | B | 29 | 60 | 2.70 |
| C4 | Synthetic | | | | PEDOT:PSS (Step (iii) twice) | B | 25 | — | 2.50 |
| C5 | Synthetic | | | | PEDOT:PSS mixed: once PEDOT:PSS: once (Step (iii) twice) | B | 12 | — | 1.23 |
| C6 | Synthetic | | | | PEDOT:PSS: once PEDOT:PSS mixed: once (Step (iii) twice) | A | 20 | — | 1.25 |

As described above, the drying in the step (ii-b) and the step (Y-b) was performed under the conditions of 180° C. for was lower. The reason for this is considered that, in capacitor A4, the unevenly distributed portion of the first compound is present in the vicinity of the surfaces of the anode foil and the cathode foil and thermal stability is improved.

The present disclosure relates to an electrolytic capacitor and a method for manufacturing an electrolytic capacitor.

What is claimed is:

1. A method for manufacturing an electrolytic capacitor, the method comprising:
    a step (i) of forming a capacitor element precursor that includes a separator, an anode body, a cathode body, the anode body and the cathode body each having a foil shape and facing each other with the separator disposed between the anode body and the cathode body;
    a step (ii) of disposing a first compound having a melting point of 50° C. or higher inside the capacitor element precursor, the first compound being at least one compound selected from the group consisting of a sugar and sugar alcohol; and
    a step (iii) of forming a first layer containing a first conductive polymer inside the capacitor element precursor after the step (ii), wherein:
    the step (iii) includes:
        a step (iii-a) of impregnating the capacitor element precursor with a first aqueous dispersion liquid containing the first conductive polymer after the step (ii), and
        a step (iii-b) of drying the first aqueous dispersion liquid to form the first layer, a number of hydroxyl groups in the first compound ranges from 2 to 12, inclusive,
    the step (ii) includes:
        a step (ii-a) of impregnating the capacitor element precursor with a first aqueous treatment solution containing the first compound and not containing a polymer, and
        a step (ii-b) of drying the first aqueous treatment solution to dispose the first compound inside the capacitor element precursor,
    in the step (ii-a), the capacitor element precursor is impregnated with the first aqueous treatment solution to make the first aqueous treatment solution be in contact with at least a part of at least one surface selected from the group consisting of a surface of the anode body, a surface of the cathode body, and a surface of the separator, and
    in the step (ii-b), the first aqueous treatment solution is dried to dispose the first compound on at least a part of the at least one surface.

2. The method according to claim 1, further comprising a step (X) between the step (i) and the step (ii), wherein:
    the step (X) includes:
        a step (X-a) of impregnating the capacitor element precursor with a second aqueous dispersion liquid containing a second conductive polymer, and
        a step (X-b) of drying the second aqueous dispersion liquid to form a second layer containing the second conductive polymer on at least a part of surfaces of the anode body and the cathode body,
    in the step (ii-a), the capacitor element precursor is impregnated with the first aqueous treatment solution after the step (X), and
    in the step (ii-b), the first aqueous treatment solution is dried to dispose the first compound on a surface of the second layer.

3. The method according to claim 2, wherein the second aqueous dispersion liquid contains a second compound that is at least one compound selected from the group consisting of a sugar and a sugar alcohol, the second compound having a melting point of 50° C. or higher, and
    a number of hydroxyl groups in the second compound ranges from 2 to 12, inclusive.

4. The method according to claim 2, further comprising a step (Y) of disposing a second compound having a melting point of 50° C. or higher inside the capacitor element precursor, between the step (i) and the step (X), the second compound being at least one compound selected from the group consisting of a sugar and a sugar alcohol,
    a number of hydroxyl groups in the second compound ranges from 2 to 12, inclusive,
    wherein the step (Y) includes:
        a step (Y-a) of impregnating the capacitor element precursor with a second aqueous treatment solution containing the second compound to make the second aqueous treatment solution be in contact with at least a part of at least one surface selected from the group consisting of a surface of the anode body, a surface of the cathode body, and a surface of the separator, and
        a step (Y-b) of drying the second aqueous treatment solution to dispose the second compound on at least a part of the at least one surface.

5. The method according to claim 1, wherein, in the step (ii-b), a temperature of the drying is equal to or higher than the melting point of the first compound.

6. The method according to claim 1, wherein the step (iii) is repeated multiple times.

7. The method according to claim 1, wherein a viscosity of the first aqueous dispersion liquid ranges from 1 mPa·s to 100 mPa·s, inclusive.

8. The method according to claim 1, wherein the first compound is at least one selected from the group consisting of glucose, mannitol, sorbitol, xylitol, and pentaerythritol.

9. The method according to claim 1, wherein the first conductive polymer is poly(3,4-ethylenedioxythiophene) doped with polystyrenesulfonic acid.

10. An electrolytic capacitor comprising a capacitor element, wherein:
    the capacitor element includes:
        a separator,
        an anode body and a cathode body each having a foil shape and facing each other with the separator disposed between the anode body and the cathode body, and
        an electrolyte layer being in contact with the anode body, the cathode body, and the separator,
    the electrolyte layer contains a first conductive polymer and a first compound having a melting point of 50° C. or higher, the first compound being at least one compound selected from the group consisting of a sugar and a sugar alcohol,
    a number of hydroxyl groups in the first compound ranges from 2 to 12, inclusive, and
    the electrolyte layer includes an unevenly distributed portion where the first compound is unevenly distributed in at least one selected from the group consisting of a portion in contact with the anode body, a portion in contact with the cathode body, and a portion in contact with the separator.

11. The electrolytic capacitor according to claim 10, wherein:
    the electrolyte layer includes a first layer containing the first conductive polymer and a second layer containing a second conductive polymer, the second layer being disposed on at least a part of surfaces of the anode body and the cathode body, the first layer being disposed on at least the second layer, and in the electrolyte layer, the first compound is unevenly distributed more in at least a part of a portion in contact with an interface between the first layer and the second layer than in a portion other than the at least a part of the portion.

12. The electrolytic capacitor according to claim 11, wherein the second layer contains a second compound having a melting point of 50° C. or higher, the second compound being at least one compound selected from the group consisting of a sugar and a polyhydric alcohol sugar alcohol, and a number of hydroxyl groups in the second compound ranges from 2 to 12, inclusive.

13. The electrolytic capacitor according to claim 12, wherein, in the second layer, the second compound is unevenly distributed more in at least a part of at least one portion selected from the group consisting of a portion in contact with the anode body, a portion in contact with the cathode body, and a portion in contact with the separator than in a portion other than the at least a part of the at least one portion.

14. The electrolytic capacitor according to claim 10, wherein the first compound is at least one selected from the group consisting of glucose, mannitol, sorbitol, xylitol, and pentaerythritol.

15. The electrolytic capacitor according to claim 10, wherein the first conductive polymer is poly(3,4-ethylenedioxythiophene) doped with polystyrenesulfonic acid.

16. The electrolytic capacitor according to claim 10, wherein the electrolyte layer contains a non-aqueous solvent or a non-aqueous electrolytic solution.

* * * * *